(12) United States Patent
Rosthauser et al.

(10) Patent No.: US 6,291,578 B1
(45) Date of Patent: Sep. 18, 2001

(54) BLOCKED POLYISOCYANATES CONTAINING PHENOLIC GROUPS

(75) Inventors: James W. Rosthauser, Pittsburgh, PA (US); Todd R. Miller, Eugene, OR (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/464,552

(22) Filed: Dec. 16, 1999

(51) Int. Cl.[7] .................. C08J 3/00; C08K 3/20; C08L 75/00; C08G 18/81; C08G 18/28
(52) U.S. Cl. .................. 524/590; 524/589; 524/591; 524/839; 524/840; 528/44; 528/45; 528/73
(58) Field of Search .................. 524/589, 590, 524/591, 839, 840; 528/45, 44, 73

(56) References Cited

U.S. PATENT DOCUMENTS

| | | | |
|---|---|---|---|
| 4,098,933 | 7/1978 | Burkhart et al. | 427/379 |
| 4,144,268 | 3/1979 | Guise | 260/513 N |
| 4,284,544 | 8/1981 | Wegner et al. | 260/29.2 TN |
| 4,352,896 | * 10/1982 | Kopp et al. | 521/118 |
| 4,522,851 | 6/1985 | Rosthauser | 427/386 |
| 4,608,304 | 8/1986 | Rosthauser | 428/378 |
| 4,619,966 | 10/1986 | Schäfer et al. | 524/589 |
| 4,895,921 | 1/1990 | Schäfer et al. | 528/45 |
| 5,296,160 | 3/1994 | Tirpak et al. | 252/182.2 |
| 5,300,556 | 4/1994 | Tirpak et al. | 524/591 |
| 5,455,297 | 10/1995 | Pedain et al. | 524/591 |
| 6,096,805 | 8/2000 | Lange et al. | 523/336 |

* cited by examiner

*Primary Examiner*—Patrick D. Niland
(74) *Attorney, Agent, or Firm*—Joseph C. Gil; N. Denise Brown

(57) ABSTRACT

The present invention relates to novel blocked polyisocyanates that are soluble or dispersible in water and which contain phenolate anions in a chemically bound form as groups which provide their solubility or dispersibility. It also relates to a process for the preparation of these blocked polyisocyanates in the form of a solution or dispersion in water, optionally in the presence of coreactants, and to their use as hardeners in two-component lacquers, binders and/or adhesive formulations.

32 Claims, No Drawings

BLOCKED POLYISOCYANATES CONTAINING PHENOLIC GROUPS

BACKGROUND OF THE INVENTION

This invention relates to novel blocked polyisocyanates that are soluble or dispersible in water and which contain phenolate anions in a chemically bound form as groups which provide their solubility or dispersibility. It also relates to a process for the preparation of these blocked polyisocyanates in the form of a solution or dispersion in water, optionally in the presence of coreactants, and to their use as hardeners in two-component lacquers, binders, or adhesive formulations.

Water-dispersible blocked polyisocyanates are known as disclosed by U.S. Pat. Nos. 4,098,933 and 4,284,544. Their primary utility has, however, been as cross-linkers for aqueous polyurethane dispersions, polyester polyols or polyhydroxy polyacrylates. The compounds mentioned in these publications may be used in aqueous solution or dispersion, inter alia in combination with water-dispersible or water-soluble polyhydroxyl compounds as binders for polyurethane lacquers that are applied from the aqueous phase. If, however, the polyhydroxyl compounds used are not normally soluble in water, the two components must first be modified in separate reaction mixtures to render them hydrophilic and then emulsified in water with the aid of organic cosolvents, and the two reaction mixtures are then mixed together. In the processes described in the aforesaid prior publications, moreover, a solvent-free preparation of water-dispersible or water-soluble blocked polyisocyanate is possible only with the addition of large quantities of ionic starting components, or large proportions of polyethers containing ethylene oxide units as hydrophilic reaction components. This has disadvantageous effects on the resistance to water and stability to light of the surface structures finally obtained.

Thus, in the process for the preparation of the known water soluble or dispersible blocked polyisocyanates, a significant portion of the isocyanate groups present in the polyisocyanates used as starting material is used up by the hydrophilic modification. The cross-linking capacity of the polyisocyanates is thereby considerably reduced. Accordingly, it is one object of the present invention to provide water soluble or dispersible polyisocyanates in which the hydrophilic group which renders the polyisocyanates soluble or dispersible takes part in the cross-linking reaction so that it becomes incorporated in the polyisocyanates and thereby preserves their cross-linking potential.

This object can be achieved by providing the blocked polyisocyanates as described in, for example, U.S. Pat. Nos. 4,522,851 and 4,608,304. The incorporated carboxylic acid groups therein are rendered hydrophilic by neutralizing them with volatile amine compounds. When the coating cures, the amine compound is removed from the coating and the freed carboxylic acid, besides being less hydrophilic, can further react with epoxide groups included in the formulation. Thus, additional crosslinking sites are provided. However, this technology is limited to those cases wherein the formulations contain aqueous resins with epoxide groups. In many cases, these epoxide resins have also been made hydrophilic by the incorporation of polyethylene oxide so that the overall hydrophilicity is increased.

This object can also be achieved by providing the blocked polyisocyanates according to U.S. Pat. Nos. 4,144,268 and 4,284,544. The hydrophilic carbamoyl sulfonate groups present in the blocked polyisocyanates according to these patents also serve a double function. They ensure that the polyisocyanates are soluble or dispersible in water and also take part in the crosslinking reaction at the same time losing their hydrophilic character. The low pH of aqueous solutions of these blocked isocyanates (ca. 3–6), however, limits their usefulness to systems with neutral or lower pH values.

Another method which yields novel blocked polyisocyanates, which are soluble or dispersible in water, is described in, for example, U.S. Pat. Nos. 4,619,966 and 4,895,921. Cyanurea anions are chemically bound with polyisocyanates to function as groups that ensure their solubility or dispersibility. These blocked polyisocyanates can be used in the form of a solution or dispersion in water as hardeners in two-component lacquers. However, due to the low reactivity of dicyanamide anion with isocyanates, it is not possible to prepare these blocked isocyanates directly in aqueous solution. Thus, the aqueous dispersions of the blocked polyisocyanates must be formed in a second step.

Methods for the direct preparation of blocked polyisocyanates in aqueous media are known and described in, for example, U.S. Pat. No. 5,296,160. These solutions can even be prepared in the presence of polyhydroxyl compounds as is described in, for example, U.S. Pat. No. 5,300,556, when the appropriate blocking agents are selected. However, the polyisocyanates must be modified to be dispersible in water, and therefore have lower crosslinking potential than ones wherein the blocking agent provides hydrophilicity.

Surprisingly, it has been found that novel blocked polyisocyanates that are soluble or dispersible in water and contain phenolate anions as groups that provide their solubility or dispersibility can be prepared directly in aqueous media. Processes for the preparation of these blocked polyisocyanates in the form of a solution or dispersion in water, optionally in the presence of coreactants, as well as their use as hardeners in two-component lacquers, binders, or adhesive formulations, has also been found. In addition to being compatible with the highly alkaline aqueous resins, they can serve as crosslinking sites for systems with neutral or higher pH values.

SUMMARY OF THE INVENTION

This invention relates to a blocked polyisocyanate composition having a latent isocyanate group content of from about 0.5 to about 25%, preferably from about 1 to about 10% by weight. This blocked polyisocyanate composition comprises:

(A) at least one organic polyisocyanate component, preferably an organic polyisocyanate having aliphatically-bound and/or cycloaliphatically-bound isocyanate groups; and (B) at least one compound corresponding to one of the general formulas:

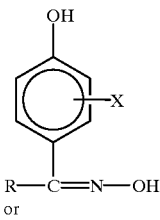

R—C=N—OH or

-continued

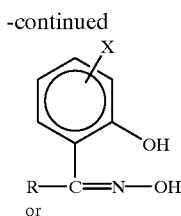

or

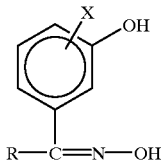

wherein:
R: represents a hydrogen atom, an alkyl group having from 1 to 12 carbon atoms, a phenyl group, a substituted phenyl group, or a substituted hydroxyphenyl group; and
X: represents a hydrogen atom, an alkyl group having from 1 to 12 carbon atoms, an alkoxy group having from 1 to 12 carbon atoms, a phenyl group, a substituted phenyl group, or a methylol radical, or preferably an alkyl methylol radical, or more preferably an alkyl methylol radical having from 1 to 12 carbon atoms;

wherein components (A) and (B) are present in quantities such that the NCO:OH molar ratio is from about 1:4 to about 4:1, and preferably from about 1:1.1 to about 2:1.

The present invention also relates to a process for the preparation of the blocked polyisocyanates having a latent isocyanate group content of about 0.5 to about 25%, preferably from about 1 to 10% by weight. This process comprises (1) reacting
  (A) at least one organic polyisocyanate, preferably an organic polyisocyanate having aliphatically-bound and/or cycloaliphatically-bound isocyanate groups; with
  (B) at least one compound corresponding to at least one of the general formulas:

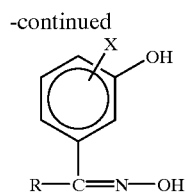

or

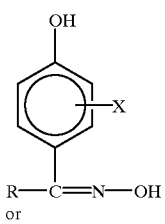

or

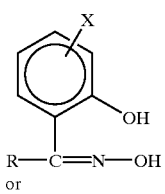

-continued

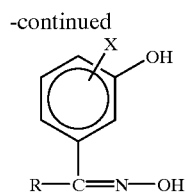

wherein:
R: represents a hydrogen atom, an alkyl group having from 1 to 12 carbon atoms, a phenyl group, a substituted phenyl group, or a substituted hydroxyphenyl group; and
X: represents a hydrogen atom, an alkyl group having from 1 to 12 carbon atoms, an alkoxy group having from 1 to 12 carbon atoms, a phenyl group, a substituted phenyl group, or a methylol radical, or preferably an alkyl methylol radical, or more preferably an alkyl methylol radical having from 1 to 12 carbon atoms;

wherein components (A) and (B) are present in quantities such that the NCO:OH molar ratio is from about 1:4 to about 4:1, preferably from about 1:1.1 to about 2:1.

This invention also relates to aqueous dispersions of these blocked olyisocyanate compositions which are characterized by a latent socyanate group content of about 0.5 to about 25%, preferably from about to about 10% by weight, comprising (A) at least one organic polyisocyanate, preferably an organic polyisocyanate having aliphatically-bound and/or cycloaliphatically-bound isocyanate groups;
(B) at least one compound corresponding to at least one of the general formulas:

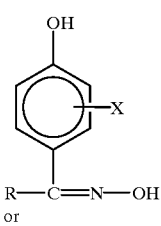

or

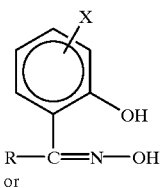

or

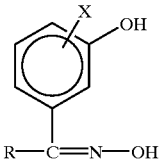

wherein:
R: represents a hydrogen atom, an alkyl group having from 1 to 12 carbon atoms, a phenyl group, a substituted phenyl group, or a substituted hydroxyphenyl group; and
X: represents a hydrogen atom, an alkyl group having from 1 to 12 carbon atoms, an alkoxy group having from 1 to 12 carbon atoms, a phenyl group, a substituted phenyl group, or a methylol radical, or preferably an alkyl methylol radical, or more preferably an alkyl methylol radical having from 1 to 12 carbon atoms; and (C) water wherein components (A) and (B) are present in quantities such that the NCO:OH molar ratio is from about 1:4 to about 4:1, preferably from about 1.1 to about 2:1 and wherein the amount of water, i.e. component (C), is from 10 to 90% by weight, preferably 30 to 80% by weight, and most preferably 50 to 70% by weight, based on the entire weight of the composition.

The present invention also provides a process for the preparation of an aqueous solution of a blocked polyisocyanate composition having a latent isocyanate group content of from about 0.5 to about 25%, preferably from about 1 to about 10% by weight, comprising (1) reacting (A) at least one organic polyisocyanate, preferably an organic polyisocyanate having aliphatically-bound and/or cycloaliphatically-bound isocyanate groups; with (B) at least one compound corresponding to at least one of the general formulas:

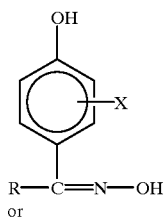

or

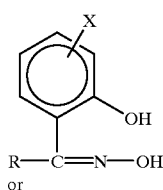

or

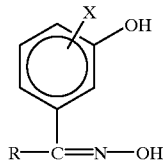

wherein:
R: represents a hydrogen atom, an alkyl group having from 1 to 12 carbon atoms, a phenyl group, a substituted phenyl group, or a substituted hydroxyphenyl group; and
X: represents a hydrogen atom, an alkyl group having from 1 to 12 carbon atoms, an alkoxy group having from 1 to 12 carbon atoms, a phenyl group, a substituted phenyl group, or a methylol radical, or preferably an alkyl methylol radical, or more preferably an alkyl methylol radical having from 1 to 12 carbon atoms;
in the presence of
(C) water wherein components (A) and (B) are present in quantities such that the NCO:OH molar ratio is from about 1:4 to about 4:1, preferably from about 1:1.1 to about 2:1 and wherein the amount of water, i.e., component (C), is from 10 to 90% by weight, preferably 30 to 80% by weight, most preferably 50 to 70% by weight, based on the entire weight of the composition.

DETAILED DESCRIPTION OF THE INVENTION

The water-dispersible, blocked polyisocyanates of the present invention preferably contain an average of about 1 to about 5, preferably about 2 to about 5, blocked isocyanate groups per molecule and may be prepared from virtually any organic polyisocyanate, preferably from polyisocyanates containing from 2 to 4 isocyanate groups. Especially preferred are polyisocyanates having aliphatically-bound and/or cycloaliphatically-bound isocyanate groups, although polyisocyanates having aromatically-bound isocyanate groups may also be used.

The polyisocyanates used for preparing the water-dispersible blocked polyisocyanates may be polymeric or monomeric in nature, or adducts prepared from organic diisocyanates which additionally contain biuret, allophanate or urethane groups or isocyanurate rings. Suitable polyisocyanates which may be used as such or as intermediates for preparing polyisocyanate adducts include, for example, ethylene diisocyanate, 1,4-tetramethylene diisocyanate, 1,6-hexamethylene diisocyanate, 2,4,4-trimethyl-1,6-hexamethylene diisocyanate, α,α,α',α,'-tetramethyl-1,3- and/or -1,4-xylylene diisocyanate, 1,12-dodecane diisocyanate, cyclobutane-1,3-diisocyanate, cyclohexane-1,3- and 1,4-diisocyanate and mixtures of these isomers, 1-isocyanato-2-isocyanatomethyl cyclopentane, 1-isocyanato-3,3,5-trimethyl-5isocyanatomethyl cyclohexane, 2,4- and 2,6-hexahydrotolylene diisocyanate and mixtures of these isomers, 2,2'-, 2,4'- and/or 4,4'-dicyclohexyl methane diisocyanate, 1,3- and 1,4-phenylene diisocyanate, 2,4- and 2,6-tolylene diisocyanate and mixtures of these isomers, naphthalene-1,5-diisocyanate, 4-isocyanatomethyl-1,8-octamethylene diisocyanate (NTI), triphenyl methane-4,4',4"-triisocyanate, diphenyl methane-2,2'-, -2,4'- and/or 4,4'-diisocyanate, and polyphenyl polymethylene polyisocyanates of the type obtained by condensing aniline with formaldehyde followed by phosgenation, as well as mixtures of the above-mentioned polyisocyanates.

Polyisocyanate adducts containing urea groups, or preferably urethane groups, comprise the reaction product of one (or more) of the previously mentioned diisocyanates with one or more compounds containing 2 or more isocyanate-reactive hydrogens. These adducts may be prepared according to the process as described in, for example, U.S. Pat. No. 3,183,112, the disclosure of which is herein incorporated by reference. In preparing polyisocyanate adducts, the average isocyanate functionality is determined from the functionality of the compounds containing isocyanate-reactive hydrogens. For example, when an excess of a diisocyanate is reacted with a diol, a polyisocyanate with a functionality of 2 will be produced, while a triol co-reactant will result in a polyisocyanate functionality of 3. By using mixtures of compounds containing isocyanate-reactive hydrogens, various functionalities can be obtained. The preferred isocyanate-reactive hydrogens are provided by hydroxyl groups although amino groups are not excluded. Suitable compounds containing isocyanate-reactive hydrogens include those compounds as are described in, for example, U.S. Pat. No. 3,183,112, the disclosure of which is incorporated herein by reference, and compounds such as ethylene glycol, 1,2- and 1,3-propylene glycol, 1,3- and 1,4-butane diol, 1,6-hexanediol, 2,2 dimethyl-1,3-propylene glycol, glycerine, trimethylol propane, ethylene diamine, diethylene triamine and triethylene tetraamine. 1,3- and 1,4-butane diol, trimethylolpropane and mixtures therreof are particularly preferred. Preferred diisocyanates are the various isomers of dicyclohexylmethane diisocyanate, 1,6-hexamethylene isocyanate, α,α,α',α,'-tetramethyl-1,3- and/ or -1,4-xylylene diisocyanate and isophorone diisocyanate.

Alternately, polyisocyanate adducts with organic compounds containing at least two isocyanate-reactive groups can be used in place of he diisocyanates or low molecular weight polyisocyanate adducts. These materials are often referred to, by those with experience in the art, as repolymers.

The organic compounds containing at least two isocyanate-reactive groups which are reacted with the previously described organic diisocyanates to prepare the isocyanate-terminated prepolymers can be divided into two groups, i.e., high molecular weight compounds with molecular weights from about 300 to 6,000, preferably from about 300 to 3,000, and the previously described low molecular weight compounds with molecular weights below about 300. Examples of the high molecular weight compounds are polyester polyols, polyether polyols, polyhydroxy polycarbonates, polyhydroxy polyacetals, polyhydroxy polyacrylates, F polyhydroxy polyester amides and polyhydroxy polythioethers. The polyester polyols, polyether polyols and polyhydroxy polycarbonates are preferred.

Suitable polyester polyols include reaction products of dihydric alcohols and dibasic carboxylic acids. Instead of free dicarboxylic acids, the corresponding dicarboxylic acid anhydrides or dicarboxylic acid esters of lower alcohols or mixtures thereof may be used for preparing the polyesters. The dicarboxylic acids may be aliphatic, cycloaliphatic, aromatic and/or heterocyclic and they may be substituted, e.g., by halogen atoms, and/or they may be unsaturated. The following are mentioned as examples: succinic acid; adipic acid; suberic acid; azelaic acid; sebacic acid; phthalic acid; isophthalic acid; trimellitic acid; phthalic anhydride;

tetrahydrophthalic anhydride; hexahydrophthalic anhydride; tetrachlorophthalic anhydride; endomethylene tetrahydrophthalic anhydride; glutaric anhydride; maleic acid; maleic anhydride; fumaric acid; dimeric fatty acids such as oleic acid, dimethyl terephthalate and bis-glycolterephthalate. Suitable dihydric alcohols include, e.g., ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol. The polyesters may also contain a proportion of carboxyl end groups. Polyesters of lactones, e.g., α-caprolactone or hydroxycarboxylic acids, e.g., β-hydroxycaproic acid, may also be used.

Polycarbonates containing hydroxy groups include those known per se, such as, the products obtained from the reaction of diols such as propanediol(1,3), butanediol-(1,4) and/or hexanediol-(1,6), diethylene glycol, triethylene glycol or tetraethylene glycol with diarylcarbonates, e.g., diphenylcarbonate, or phosgene.

Suitable polyether polyols are obtained in known manner by the reaction of the starting compounds which contain reactive hydrogen atoms with alkylene oxides with an ethylene oxide; propylene oxide; butylene oxide; styrene oxide; tetrahydrofuran or epichlorohydrin or with mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include, e.g., water and the dihydric alcohols set forth for preparing the polyester polyols.

Polyethers modified by vinyl polymers are also suitable for the process according to the invention. Products of this kind may be obtained by polymerizing, e.g., styrene and acrylonitrile in the presence of polyethers (U.S. Pat. Nos. 3,383,351; 3,304,273; 3,523,095; 3,110,695 and German Patent No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from aldehydes, e.g., formaldehyde, and glycols such as diethylene glycol, triethylene glycol, ethoxylated 4,4'-dihydroxy-diphenyldimethylmethane, and hexanediol-(1,6). Polyacetals suitable for the purpose of the invention may also be prepared by the polymerization of cyclic acetals.

Suitable polyhydroxy polyester amides and polyamides are, for example, the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

The prepolymers may also contain the previously mentioned low molecular weight isocyanate-reactive component having an average molecular weight of up to about 300. The low molecular weight compounds which may optionally be used in combination with the high molecular weight isocyanate-reactive compounds for the preparation of the isocyanate-terminated prepolymers include, for example, the dihydric alcohols which have been described for the preparation of the polyester polyols; diamines such as diaminoethane, 1,6-diaminohexane, piperazine, 2,5-dimethylpiperazine, 1-amino-3-aminomethyl-3,5,5 trimethylcyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, amino acid hydrazides, hydrazides of semicarbazidocarboxylic acids, bis-hydrazides and bis-semicarbazides; and the like. The dihydric alcohols are the preferred low molecular weight isocyanate-reactive component for preparing the isocyanate-terminated prepolymers.

In addition to the above-mentioned components which are preferably difunctional in the isocyanate polyaddition reaction, monofunctional and even small proportions of trifunctional and higher functional components generally known in polyurethane chemistry, such as trimethylolpropane, may be used in special cases in which slight branching of the isocyanate-terminated prepolymer is desired. However, these prepolymers should be substantially linear and this may be achieved by maintaining the average functionality of the prepolymer starting components below about 2.1.

The polyisocyanates or polyisocyanate adducts used to prepare the aqueous dispersions of the blocked polyisocyanates of the present invention may be used in their unmodified, hydrophobic form or they may be, albeit less preferably, rendered hydrophilic by admixture with external emulsifiers or by reaction with anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups. Use of these materials is however less preferred because it is contrary to the purpose of the present invention. The hydrophilic modifications of the hydrophobic polyisocyanate remain in the final product and thus can cause the resulting articles prepared from the blocked polyisocyanates to have poorer resistance to water than those based on the corresponding unmodified polyisocyanates.

The compounds containing lateral or terminal, hydrophilic ethylene oxide units contain at least one, preferably one, isocyanate-reactive group and are used in an amount sufficient to provide a content of hydrophilic ethylene oxide units of up to about 20% by weight, preferably about 0.5 to 10% by weight, more preferably about 1 to 6% by weight and most preferably about 2 to 6% by weight, based on the weight of the polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formula

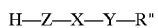

or

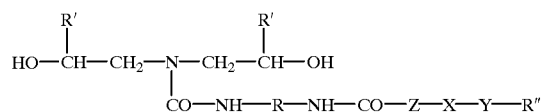

wherein:
R: represents a difunctional radical obtained by removing the isocyanate groups from a diisocyanate corresponding to those previously set forth;
R': represents hydrogen or a monovalent hydrocarbon radical containing from 1 to 8 carbon atoms, preferably hydrogen or a methyl group;
R": represents a monovalent hydrocarbon radical having from 1 to 12 carbon atoms, preferably an unsubstituted alkyl radical having from 1 to 4 carbon atoms;
X: represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide, or styrene oxide units, preferably propylene oxide units;
Y: represents oxygen or NR'"— wherein R'" has the same definition as R";
and
Z: represents a radical which corresponds to Y, but may additionally represent —NH—.

These compounds are fully described in, for example, U.S. Pat. No. 5,389,720, the disclosure of which is herein incorporated by reference.

The compounds corresponding to the above structures may be produced by the methods according to, for example, U.S. Pat. Nos. 3,905,929, 3,920,598 and 4,190,566, the disclosures of which are also herein incorporated by reference. The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

Ionically modified polyisocyanates which are known from polyurethane dispersion chemistry may also be used in the process of preparation of the blocked polyisocyanates containing phenolic groups. Their use results in polyisocyanate addition products which in addition to containing the anionic structures corresponding to one or more of the above-disclosed formulas also contain carboxylate and/or sulfonate groups. These products may be prepared from polyisocyanate prepolymers which have been prepared by using hydroxyl compounds consisting entirely or partly of polyhydric alcohols containing carboxylate and/or sulfonate groups, or by using the corresponding hydroxycarboxylic acids and/or hydroxysulfonic acids and then neutralizing the acid groups. The use of such anionic starting components is not preferred. First, the hydrophilic character of the anionic structural units, which are essential to this invention, is generally sufficient to provide that the polyisocyanate addition products will be soluble or dispersible in water. Second, when the known anionic starting components are used, the chemically incorporated anionic groups would continue to be present in the coatings, or other articles, finally obtained. Thus, these known anionic starting components would fail to contribute to the cross-linking reaction, and would therefore be contrary to the purpose of the invention.

The blocking agents that are suitable for preparing the blocked polyisocyanates of the present invention include, for example, those compounds which contain phenol groups and preferably one isocyanate-reactive group. Compounds containing more than one isocyanate-reactive group may also be used, but are less preferred because these may result in adducts with higher viscosity than desired. This isocyanate-reactive group enters into an addition reaction with an isocyanate group at temperatures above about 0° C., preferably at temperatures in the range of from about 20° C. to 50° C. The resulting addition product, in admixture with the co-reactant resins, reacts with hydroxyl groups to form polyurethanes at temperatures in the range of about 100° C. to 250° C., the reaction in some cases being accompanied by liberation of the blocking agent.

Suitable compounds to be used as blocking agents for the polyisocyanates of the present invention include, for example, those compounds which correspond to one of the general formulas set forth below:

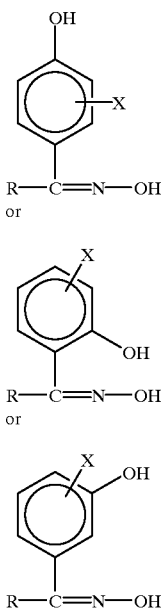

wherein:
R: represents a hydrogen atom, an alkyl group having from 1 to 12 carbon atoms, a phenyl group, a substituted phenyl group, or a substituted hydroxyphenyl group; and
X: represents a hydrogen atom, an alkyl group having from 1 to 12 carbon atoms, an alkoxy group having from 1 to 12 carbon atoms, a phenyl group, a substituted phenyl group, or a methylol radical; or preferably an alkyl methylol radical; or more preferably an alkyl methylol radical having from 1 to 12 carbon atoms.

Some illustrative examples of suitable compounds for blocking the polyisocyanate include, but are not limited to, compounds such as 2-hydroxybenzaldoxime, 3-hydroxybenzaldoxime, 4-hydroxybenzaldoxime, 2,6-dihydoxybenzaldoxime, heptylsalicylaldoxime, octylsalicylaldoxime, nonylsalicylaldoxime, dodecylsalicylaldoxime, 2-hydroxy-3-methyl benzaldoxime, 4-hydroxy-3-methoxybenzaldoxime, 2'-hydroxy-5'-nonylacetophenone oxide, 2'-hydroxy-5'-nonyl benzophenone oxime, 2,2'-dihydroxybenzophenone oxime, 4,4'-dihydroxybenzophenone oxime, etc. Preferred compounds are 2-hydroxybenzaldoxime, 3-hydroxybenzaldoxime, 4-hydroxybenzaldoxime, heptylsalicylaldoxime, octylsalicylaldoxime, nonylsalicylaldoxime, dodecylsalicylaldoxime, and 4,4,-dihydroxybenzophenone oxime.

A key feature in forming the blocked polyisocyanates of the present invention is that the blocking agent contains not only a phenolic group, but also the more reactive oxime functionality. Although the present invention is not meant to be limited by theory, it is believed that the oxime preferentially reacts with the polyisocyanate and the phenolic groups are sufficiently acidic to provide potential ionic groups upon neutralization with base.

The above-mentioned acidic phenol groups may be converted into hydrophilic anionic groups by treatment with a neutralizing agent such as, for example, an alkali metal salt or a primary, secondary or preferably tertiary amine, in an amount sufficient to render the blocked polyisocyanates water-dispersible. Suitable alkali metal salts include sodium hydroxide, potassium hydroxide, sodium hydride, potassium hydride, sodium carbonate, potassium carbonate, sodium bicarbonate and potassium bicarbonate. The use of alkali metal salts as neutralizing agents is less preferred than the use of volatile amines since they lead to reduced water resistance in the coatings produced from the water-dispersible blocked polyisocyanate compositions of the present invention.

In preparing the blocked polyisocyanates of the present invention, it is also possible to include a portion of blocking agents which are known from polyurethane chemistry. Suitable blocking agents typically used are, for example, secondary or tertiary alcohols, such as isopropanol or tert-butanol; acidic methylene containing compounds, such as malonic acid dialkyl esters, acetyl acetone or acetoacetic acid alkyl esters; oximes, such as formaldoxime, acetaldoxi me, methyl ethyl ketoxi me, cyclohexanone oxime, acetophenone oxime, benzophenone oxime or diethyl glyoxime; lactams, such as ε-caprolactam, δ-valerolactam; phenols, such as phenol, cresol or nonyl phenol; N-alkyl amides, such as N-methyl acetamide; imides, such as phthalimide; or imidazole. Use of these blocking agent compounds or mixtures of them with the blocking agents of the present invention are less preferred because they do not assure water dispersibility as with the blocking agents of the present invention.

In order to make these polyisocyanates water-dispersible, it may be additionally necessary, but is less preferred, to chemically incorporate a hydrophilic group, i.e., an anionic group or a potential anionic group, into the polyisocyanate component. Suitable hydrophilic components contain at least one isocyanate-reactive hydrogen and at least one hydrophilic group or potential hydrophilic group. Examples include aliphatic hydroxy carboxylic acids, aliphatic or aromatic aminocarboxylic acids with primary or secondary amino groups, aliphatic hydroxy sulfonic acids and aliphatic or aromatic aminosulfonic acids with primary or secondary amino groups. These acids preferably have molecular weights below about 300. It should be emphasized that the acid hydrogens are not considered to be isocyanate-reactive hydrogens due to their sluggish reactivity with isocyanates.

The preferred anionic groups for use in this mode of the present invention are carboxylate groups and these groups may be introduced by using hydroxy-carboxylic acids of the general formula:

$$(HO)_x\ Q(COOH)_y$$

wherein:
Q: represents a straight or branched, hydrocarbon radical containing from 1 to 12 carbon atoms, and
x and y: each independently represent a value from 1 to 3.

Examples of these hydroxy-carboxylic acids include citric acid and tartaric acid.

The preferred acids are those which correspond to the above-mentioned formula wherein x=2 and y=1, and wherein Q represents: 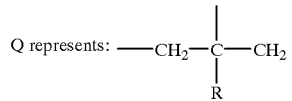

wherein:
R: represents a hydrogen atom, an alkyl radical containing from 1 to 12 carbon atoms, a cycloalkyl radical containing from 1 to 12 carbon atoms, a phenyl group, or a substituted phenyl group.

These dihydroxy alkanoic acids are described in, for example, U.S. Pat. No. 3,412,054, the disclosure of which is herein incorporated by reference. The preferred group of dihydroxy alkanoic acids are the α,α-dimethylol alkanoic acids. The most preferred acid is α,α-dimethylol propionic acid.

In order to prepare water-dispersible polyisocyanates containing about 2 to 5 blocked isocyanates per molecule from a difunctional polyisocyanate starting component such as a diisocyanate, it is necessary to use hydrophilic components containing at least two isocyanate-reactive hydrogens. For example, the use of a dihydroxy alkanoic acid to provide hydrophilicity results in the linking of 2 diisocyanate molecules and maintains the isocyanate functionality of the molecule at 2. To the contrary, the reaction of a diisocyanate with a monohydroxy alkanoic acid produces a monoisocyanate. While a small portion of monoisocyanates is acceptable since they may function as cross-linking agents as explained in more detail below, in order to provide higher degrees of cross-linking, the isocyanate functionality should be maintained at between about 2 and 5.

The above-mentioned acid groups may be converted into hydrophilic anionic groups by treatment with a neutralizing agent such as an alkali metal salt or a primary, secondary or preferably tertiary amine in an amount sufficient to render the blocked polyisocyanates water-dispersible. Suitable alkali metal salts include sodium hydroxide, potassium hydroxide, sodium hydride, potassium hydride, sodium carbonate, potassium carbonate, sodium bicarbonate and potassium bicarbonate. The use of alkali metal salts as neutralizing agents is less preferred than the use of volatile amines since they lead to reduced water resistance in the coatings produced from the water-dispersible compositions of the present invention.

Examples of suitable amines to be used as neutralizing agents are trimethyl amine, triethyl amine, triisopropyl amine, tributyl amine, N,N-dimethyl-cyclohexyl amine, N,N-dimethylstearyl amine, N,N-dimethyl-aniline, N-methylmorpholine, N-ethylmorpholine, N-methylpiperazine, N-methylpyrrolidine, N-methylpiperidine, N,N-dimethylethanol amine, N,N-diethyl-ethanol amine, triethanol amine, N-methyldiethanol amine, dimethylaminopropanol, 2-methoxyethyldimethyl amine, N-hydroxyethyl-piperazine, 2-(2-dimethylaminoethoxy)-ethanol and 5-diethylamino-2-pentanone. The most preferred tertiary amines are those which do not contain active hydrogen(s) as determined by the Zerewitinoff test since they are capable of reacting with isocyanate groups during the curing of the compositions of the present invention.

In a preferred embodiment for this mode of the present invention, the tertiary amines are volatile. When the water-dispersible blocked polyisocyanate/aqueous resin composition of the subject application cures at elevated temperatures, the tertiary amine volatilizes, preferably at a lower temperature than the unblocking temperature of the blocked polyisocyanate, and is removed from the resulting final article. This frees the carboxylate or sulfonate group to react with other groups that may optionally be incorporated into the aqueous resin coreactant.

Albeit less preferred, the reaction to form the blocked polyisocyanates of the present invention may be carried out in the presence of solvents. Suitable solvents include, for example, the water-miscible solvents normally used in polyurethane chemistry such as esters, ketones, halogenated hydrocarbons, alkanes and arenes. Low boiling solvents include those which boil at temperatures in the range of from about 40° to 90° C., such as acetone and methyl ethyl ketone. In addition, higher boiling solvents such as, for example, N-methyl pyrrolidinone, dimethyl formamide, dimethyl sulfoxide and ethylene glycol mono(-methyl, ethyl or -butyl) ether acetate may be utilized.

In one embodiment of the process according to the invention, for example, solutions of the blocked polyisocyanate containing the hydrophilic phenolate group are combined at room temperature or at remoderately elevated temperature (the hydrophilic component may also be added as such to the solution of the partially blocked polyisocyanate), and held at a moderately elevated temperature such as, for example, at a temperature in the range of from about 20° C. to 50° C., until the addition reaction is over. On completion of the reaction, the dissolved end product may either be obtained as such by distilling off the solvent (if a low boiling solvent is present) and any unreacted blocking agent still present, or, if there is no need to remove excess blocking agent, the end product may be converted into an aqueous dispersion by neutralizing the phenolic groups, stirring the solution into water, and subsequently distilling off the solvent (if a low boiling solvent is present). When higher boiling solvents are used, they are maintained in the end product.

The acid groups in the compositions of the present invention may be converted into hydrophilic anionic groups by treatment with the volatile amine either before, during or after the reaction to form the blocked polyisocyanate. However, in some cases it is preferred to neutralize the acid groups after the reaction of the blocked polyisocyanate with the hydrophilic component and prior to dispersing it in water.

The aqueously dispersed coating, adhesive, or binder compositions may be prepared from aqueously dispersed blocked polyisocyanate by mixing them with a second component, optionally in the presence of an organic solvent, with water, followed by mixing the dispersions together or by mixing one component with water followed by addition of the remaining component. The coating composition should be formulated at about 10 to 90% by weight solids, preferably 20 to 80% by weight solids, most preferably 30 to 50% by weight solids, based on the total weight of the coating composition. The weight ratio of the blocked polyisocyanate component to the isocyanate-reactive resin component should be about 1:10 to 10:1, preferably about 1:2 to 2:1.

The aqueous solutions or dispersions of the blocked polyisocyanate products according to the invention may be processed in combination with suitable reactants such as, for example, the known aqueous polyurethane dispersions or even polyacrylate dispersions with isocyanate-reactive hydrogen atoms or even in combination with low molecular weight polyamines dissolved in water as thermocrosslinkable coating compositions which can be processed from the aqueous phase. It is also possible to use the aqueous solutions or dispersions of the end products obtained by the process according to the invention without adding another reactant, for example for impregnating substrates containing isocyanate-reactive hydrogen atoms. In a preferred mode of the present invention, the blocked polyisocyanates are combined with aqueous alkaline solutions of phenol formaldehyde resins prepared using an excess of formaldehyde.

It can also be an advantage to add to the dispersions reactive carbonyl compounds, low molecular weight N-methylol compounds, aminoplast and phenoplast precondensates and to convert blocking agents released in this way into relatively high molecular weight components which neither interfere with formation of the film, nor exert any plasticizing effect, and hence to increase the degree of crosslinking. Formaldehyde, dimethylol urea, trimethylol melamine, hexamethylol melamine, etherified methylolated melamines and bis-alkoxy methyl urea, are preferably used for this purpose.

By careful selection of the processing conditions, it is even possible to prepare the blocked polyisocyanates of the present invention in an aqueous solution or dispersion of the coreactant resin. Temperatures below about 50° C. are preferred. Coreactant resins containing a minimum of groups which are isocyanate-reactive at the processing temperature are preferred for this mode of practicing the invention.

The aqueously dispersed compositions of the present invention may further contain additives conventionally employed in coating, adhesive, and binder technology, such as, for example, organic pigments, inorganic pigments, surfactants, thickeners, waxes, stabilizers and the like.

In normal usage, after the aqueously dispersed composition is prepared, it is coated on a substrate by brush, roller, spray, dip, doctor blade or similar application means.

The present invention provides aqueously dispersed compositions which have properties suitable for use as a one-package coating, adhesive, or binder systems in which the blocked polyisocyanate component is substantially unreactive with the isocyanate-reactive resin component at room temperature. In this type of system, cross-linking between the latent NCO groups of the blocked polyisocyanate component and the isocyanate-reactive groups of the isocyanate-reactive resin is accomplished by baking an applied coating at an elevated temperature. For example, the present invention one-package coating system may be cured by heating a coated article at a temperature between about 100° C. to 250° C., preferably 100° C. to 200° C., for a period of time between about 5 minutes and about two hours which is sufficient to effect a thermosetting cure.

During heating, the water is first evaporated, the crosslinking reaction beginning after the reforming temperature of the blocked polyisocyanate has been reached.

It is possible in this way to obtain non-tacky films, coatings, adhesives and binders, which may be used for a variety of different applications. These articles may most often be obtained by coating the desired substrate, or combining the material to be bound with the aqueous compositions.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following components were used in the examples:
Isocyanate A: a polymeric MDI blend having a viscosity of 200 mPa·s, and an isocyanate content of 31.5%
Isocyanate B: a urethane adduct of a polymeric MDI blend with a 2200 molecular weight monofunctional poly (ethylene oxide), having a viscosity of about 500 mPa·s, and an isocyanate content of 24.5%
Isocyanate C: a blend of trimer and higher molecular weight adducts of HDI (hexamethylene diisocyanate) having a viscosity of about 3,000 mPa·s, and an isocyanate content of 21.5%
Resole A: an aqueous solution of phenol formaldehyde resin prepared using excess formaldehyde, having a solids level of about 57%, a viscosity about 200 mPa·s, and a pH value of about 11; a commercially available product from Borden Chemical registered under the name Cascophen® OS57H.
Blocking Agent A: 4-hydroxybenzaldehyde oxime
Blocking Agent A was prepared in the laboratory by the following procedure:

Into a 500 ml round bottom flask equipped with a magnetic stirring bar, 40.49 g (331.6 mmol) of 4-hydroxybenzaldehyde were added. The aldehyde was dissolved in 240 ml methanol. To the stirred solution, 22.99 g (348.1 mmol) of 50% aqueous solution of hydroxylamine were added over a 15 min. period. The mixture was stirred for an additional 2 hr, at which time it was judged to be complete by the disappearance of the starting aldehyde as observed by thin layer chromatography ($SiO_2$/ $CH_3OH$:$CH_2CL_2$ 5:95). The solvent was removed in vacu to give the product 4-hydroxybenzaldehyde oxime as a dark tan oil, which was recrystallized from water.

Blocking Agent B: bis (4-hydroxy) benzophenone oxime (This compound was prepared in the laboratory by the following procedure.)

Into a 500 ml round bottom flask equipped with a magnetic stirring bar, 50 g (233.4 mmol) of bis(4-hydroxybenzophenone) and 28.5 g (410.8 mmol) hydroxylamine hydrochloride were added. The solids were dissolved in a mixture of 140 ml ethanol and 50 ml water. To the stirred solution, 23.3 g (282.4 mmol) of sodium acetate were added portion-wise over a 15 min. period. The mixture was stirred for an additional 2 hr, at which time it was judged to be complete by the disappearance of the starting aldehyde as observed by thin layer chromatography ($SiO_2$/ $CH_3OH$:$CH_2CL_2$ 3:97). The mixture was chilled to 0° C. and a precipitate formed. Solids were filtered off and the product, bis (4-hydroxy) benzophenone oxime, was concentrated in vacu to a light tan crystalline solid that was used without further purification.

Example 1

Into a 300 ml beaker, 9.45 g (68.9 mmol) of Blocking Agent A and 100 g of distilled water were added at room temperature. Then, 5.50 g (68.75 mmol) of sodium hydroxide solution (50% aqueous) were added while stirring. The solution became clear after 10 minutes stirring at low shear. 90.59 g (689.9 mmol) of Isocyanate A were added over a period of 17 minutes to the oxime solution (all at room temperature) while being mixed under high shear (8,000 rpm in a IKA Works Ultraturrax T-25 high speed/high shear mixer). The mixture was stirred for an additional 4 minutes at 8,000 rpm with an accompanying exotherm to 46° C. The resultant fluid resin mixture was a dispersion as indicated by a blue Tyndall effect, and had a residual (unblocked) isocyanate content of about 11.5% as determined by titration.

Example 2

Into a 300 ml beaker, 25.7 g (187.6 mmol) of Blocking Agent A and 104.5 g of distilled water were added at room temperature. 18.94 g (187.5 mmol) of triethylamine were added while stirring. The solution became clear after 30 minutes stirring at low shear. Then, 25 g (187.5 mmol) of Isocyanate A were added over a period of 15 minutes to the oxime solution (all at room temperature) while being mixed under high shear (8,000 rpm in a IKA Works Ultraturrax T-25 high speed/high shear mixer). The mixture was stirred for an additional 4 minutes at 8,000 rpm with an accompanying exotherm to 48° C. The resultant fluid resin mixture was a dispersion as indicated by a milky white appearance.

Example 3

Into a 1000 ml beaker, 80.9g (590.5 mmol) of Blocking Agent A, 23.62 g (590.5 mmol) of sodium hydroxide, and 306.8 g of distilled water were added at room temperature. The solution became clear after 30 minutes stirring at low shear. Then, 100 g (590.5 mmol) of Isocyanate B were added over a period of 1 hour and 15 minutes to the oxime solution (all at room temperature) while being mixed under high shear (8000 rpm in a IKA Works Ultraturrax T-25 high speed/high shear mixer). The resultant thixotropic resin mixture was a dispersion as indicated by a milky white appearance. It had a pH value of 11.2 and a viscosity of 1,820 mPOa·s at 12 rpm, 2,780 mPa·s at 30 rpm, and 4,740 mPa·s at 12 rpm.

Example 4

Into a 500 ml beaker, 72.85 g of the aqueous dispersion from Example 3, 100 g of Resole A and 95 g of distilled water were added at room temperature. The resultant resin mixture had a viscosity of 82 mPa·s and a pH value of 10.9. When corresponding amounts of the same coreactants and water were used, with the exception that Isocyanate B was charged at the end of the formation of the resin mixture as described in the procedure of Example 1, the resultant resin mixture had a viscosity of 80 mPa·s and a pH value of 10.98.

Example 5

Into a 300 ml beaker, 20.22 g (147.6 mmol) of Blocking Agent A and 90.2 g of distilled water were added at room temperature. Then, 14.91 g (147.6 mmol) of triethylamine were added while stirring. The solution became clear after 5 minutes stirring at low shear. The, 25 g (147.5 mmol) of Isocyanate B were added over a period of 15 minutes to the oxime solution ( all at room temperature) while being mixed under high shear (8000 rpm in a IKA Works Ultraturrax T-25 high speed/high shear mixer). The mixture was stirred for an additional 4 minutes at 8,000 rpm with an accompanying exotherm to 51° C. The resultant fluid resin mixture was a dispersion as indicated by a milky white appearance.

Example 6

Into a 500 ml beaker, 200 g of Resole A and 86 g distilled water was added. To this solution, 10.25 g (75 mmol) of Blocking Agent A and 7.56 g (75 mmol) of triethylamine were added while stirring under high shear (8,000 rpm in a IKA Works Ultraturrax T-25 high speed/high shear mixer). Then, 12.67 g of Isocyanate B were added over a 5 minute period. The resultant milky white dispersion had a viscosity of 70 mPa·s and a pH value of 11.3.

Example 7

Into a one pint jar, 135.6 g distilled water, 25 g of Blocking Agent A, and 14.6 g of a 50% aqueous solution of sodium hydroxide were added. Then, 35.58 g of Isocyanate C were added over a one minute period while the sample was mixed under high shear (8,500 rpm in a IKA Works Ultraturrax T-20 Basic high shear mixer). Mixing speed was increased to 9,500 for an additional three minutes after which the mixture exothermed to 36° C. The resultant low viscosity milky material was slightly yellow and homogeneous.

Example 8

Into a one half pint jar, 47.7 g distilled water, 10.9 g of Blocking Agent B, and 6.6 g of a 50% aqueous solution of sodium hydroxide were added. The mixture was stirred for six minutes at room temperature and a light brown clear solution resulted. 8.1 g of Isocyanate C were added over a one minute period while the sample was mixed under high shear (8,500 rpm in a IKA Works Ultraturrax T-20 Basic high shear mixer). Mixing speed was increased to 9,500 for an additional three minutes after which the mixture exothermed to 37° C. The resultant low viscosity milky material was light brown and homogeneous.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A blocked polyisocyanate composition having a latent isocyanate group content of from about 0.5 to about 25% by weight, comprising:
   (A) at least one organic polyisocyanate, and
   (B) at least one compound corresponding to one of the general formulas:

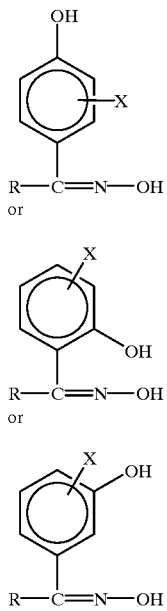

wherein:
   R: represents a hydrogen atom, an alkyl group having from 1 to 12 carbon atoms, a phenyl group, a substituted phenyl group, or a substituted hydroxyphenyl group; and
   X: represents a hydrogen atom, an alkyl group having from 1 to 12 carbon atoms, an alkoxy group having from 1 to 12 carbon atoms, a phenyl group, a substituted phenyl group, or a methylol radical;
wherein components (A) and (B) are present in quantities such that the NCO:OH molar ratio is from about 1:4 to 4:1.

2. The blocked polyisocyanate composition of claim 1, wherein the latent isocyanate group content is from 1 to 10% by weight.

3. The blocked polyisocyanate composition of claim 1, wherein components (A) and (B) are present in quantities such that the NCO:OH molar ratio is from about 1:1.1 to about 2:1.

4. The blocked polyisocyanate composition of claim 1, wherein X represents an alkyl methylol radical.

5. The blocked polyisocyanate composition of claim 4, wherein X represents an alkyl methylol radical having from 1 to 12 carbon atoms.

6. The blocked polyisocyanate composition of claim 1, wherein (B) comprises a compound selected from the group consisting of 2-hydroxybenzaldoxime, 3-hydroxybenzaldoxime, 4-hydroxybenzaldoxime, heptylsalicylaldoxime, octylsalicylaldoxime, nonylsalicylaldoxime and dodecylsalicylaldoxime.

7. The blocked polyisocyanate composition of claim 1, wherein the molar ratio of NCO groups of component (A) to oxime groups of component (B) is from 0.2:1.0 to 0.9:1.0.

8. The blocked polyisocyanate composition of claim 7, wherein the molar ratio of NCO groups of component (A) to oxime groups of component (B) is from 0.5:1.0 to 0.8:1.0.

9. The blocked polyisocyanate composition of claim 1, wherein (A) is selected from the group consisting of isomers of methylene dicyclohexyl diisocyanate, adducts of 1,6-hexamethylene diisocyanate, isophorone diisocyanate, and mixtures thereof.

10. A process for the preparation of a blocked polyisocyanate composition having a latent isocyanate group content of from about 0.5 to about 25% by weight, comprising:
(1) reacting
(A) at least one organic polyisocyanate, with
(B) at least one compound corresponding to one of the general formulas:

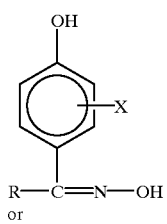

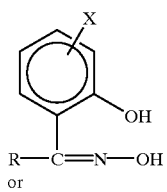

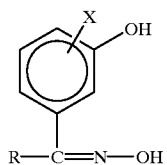

wherein:
R: represents a hydrogen atom, an alkyl group having from 1 to 12 carbon atoms, a phenyl group, a substituted phenyl group, or substituted hydroxyphenyl group; and
X: represents a hydrogen atom, an alkyl group having from 1 to 12 carbon atoms, an alkoxy group having from 1 to 12 carbon atoms, a phenyl group, a substituted phenyl group, or a methylol radical;
wherein components (A) and (B) are present in quantities such that the NCO:OH molar ratio is from about 1:4 to 4:1.

11. The process of claim 10, wherein the latent isocyanate group content is from 1 to 10% by weight.

12. The process of claim 10, wherein components (A) and (B) are present in quantities such that the NCO:OH molar ratio is from about 1:1.1 to about 2:1.

13. The process of claim 10, wherein X represents an alkyl methylol radical.

14. The process of claim 13, wherein X represents an alkyl methylol radical having from 1 to 12 carbon atoms.

15. The blocked polyisocyanate of claim 10, wherein (B) comprises a compound selected from the group consisting of 2-hydroxybenzaldoxime, 3-hydroxybenzaldoxime, 4-hydroxybenzaldoxime, heptylsalicylaldoxime, octylsalicylaldoxime, nonylsalicylaldoxime and dodecylsalicylaldoxime.

16. The process of claim 10, wherein the molar ratio of NCO groups of component (A) to oxime groups of component (B) is from 0.2:1.0 to 0.9:1.0.

17. The process of claim 16, wherein the molar ratio of NCO groups of component (A) to oxime groups of component (B) is from 0.5:1.0 to 0.8:1.0.

18. The process of claim 10, wherein (A) is selected from the group consisting of isomers of methylene dicyclohexyl diisocyanate, adducts of 1,6-hexamethylene diisocyanate, isophorone diisocyanate, and mixtures thereof.

19. An aqueous dispersion of a blocked polyisocyanate composition characterized by a latent isocyanate group content of about 0.5 to about 25% by weight, comprising:
(A) at least one organic polyisocyanate,
(B) at least one compound corresponding to one of the general formulas:

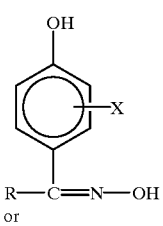

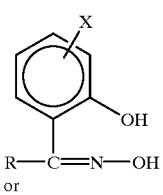

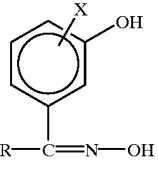

wherein:
R: represents a hydrogen atom, an alkyl group having from 1 to 12 carbon atoms, a phenyl group, a substituted phenyl group, or a substituted hydroxyphenyl group; and
X: represents a hydrogen atom, an alkyl group having from 1 to 12 carbon atoms, an alkoxy group having from 1 to 12 carbon atoms, a phenyl group, a substituted phenyl group, or a methylol radical; and
(C) water;
wherein components (A) and (B) are present in quantities such that the NCO:OH molar ratio is from about 1:4 to about 4:1, and component (C) is present in a quantity of from 10 to 90% by weight, based on the entire weight of the composition.

20. The aqueous dispersion of claim 19, wherein the latent isocyanate group content is from 1 to 10% by weight.

21. The aqueous dispersion of claim 19, wherein components (A) and (B) are present in quantities such that the NCO:OH molar ratio is from about 1:1.1 to about 2:1, and component (C) is present in a quantity of from 30 to 80% by weight, based on the entire weight of the composition.

22. The aqueous dispersion of claim 21, wherein component (C) is present in a quantity of from 50 to 70% by weight, based on the entire weight of the composition.

23. The aqueous dispersion of claim 19, wherein X represents an alkyl methylol radical.

24. The aqueous dispersion of claim 23, wherein X represents an alkyl methylol radical having from 1 to 12 carbon atoms.

25. The aqueous dispersion of claim 19, wherein (B) comprises a compound selected from the group consisting of 2-hydroxybenzal-doxime, 3-hydroxybenzaldoxime, 4-hydroxybenzaldoxime, heptylsalicylaldoxime, octylsalicylaldoxime, nonylsalicylaldoxime and dodecyl-salicylaldoxime.

26. A process for the preparation of an aqueous solution of a blocked polyisocyanate composition having a latent isocyanate group content of from about 0.5 to about 25% by weight, comprising
(1) reacting
(A) at least one organic polyisocyanate, with
(B) at least one compound corresponding to one of the general formulas:

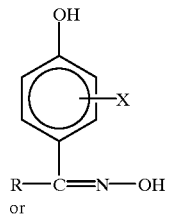

or

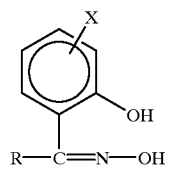

-continued
or

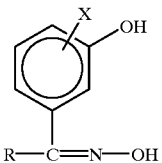

wherein:
R: represents a hydrogen atom, an alkyl group having from 1 to 12 carbon atoms, a phenyl group, a substituted phenyl group, or a substituted hydroxyphenyl group; and
X: represents a hydrogen atom, an alkyl group having from 1 to 12 carbon atoms, an alkoxy group having 1 to 12 carbon atoms, a phenyl group, a substituted phenyl group, or a methylol radical;
in the presence of
(C) water
wherein components (A) and (B) are present in quantities such that the NCO:OH molar ratio is from about 1:4 to 4:1, and wherein the amount of component (C), water, present is from 10 to 90% by weight, based on the entire weight of the composition.

27. The process of claim 26, wherein the latent isocyanate group content is from 1 to 10% by weight.

28. The process of claim 26, wherein components (A) and (B) are present in quantities such that the NCO:OH molar ratio is from about 1:1.1 to about 2:1, and wherein the amount of component (C) present is from 30 to 80% by weight, based on the entire weight of the composition.

29. The process of claim 28, wherein the amount of component (C) present is from 50 to 70% by weight, based on the entire weight of the composition.

30. The process of claim 26, wherein X represents an alkyl methylol radical.

31. The process of claim 30, wherein X represents an alkyl methylol radical having from 1 to 12 carbon atoms.

32. The process of claim 26, wherein (B) comprises a compound selected from the group consisting of 2-hydroxybenzaldoxime, 3-hydroxybenzaldoxime, 4-hydroxybenzaldoxime, heptylsalicylaldoxime, octylsalicylaldoxime, nonylsalicylaldoxime and dodecyl-salicylaldoxime.

* * * * *